United States Patent Office  2,985,254
Patented May 23, 1961

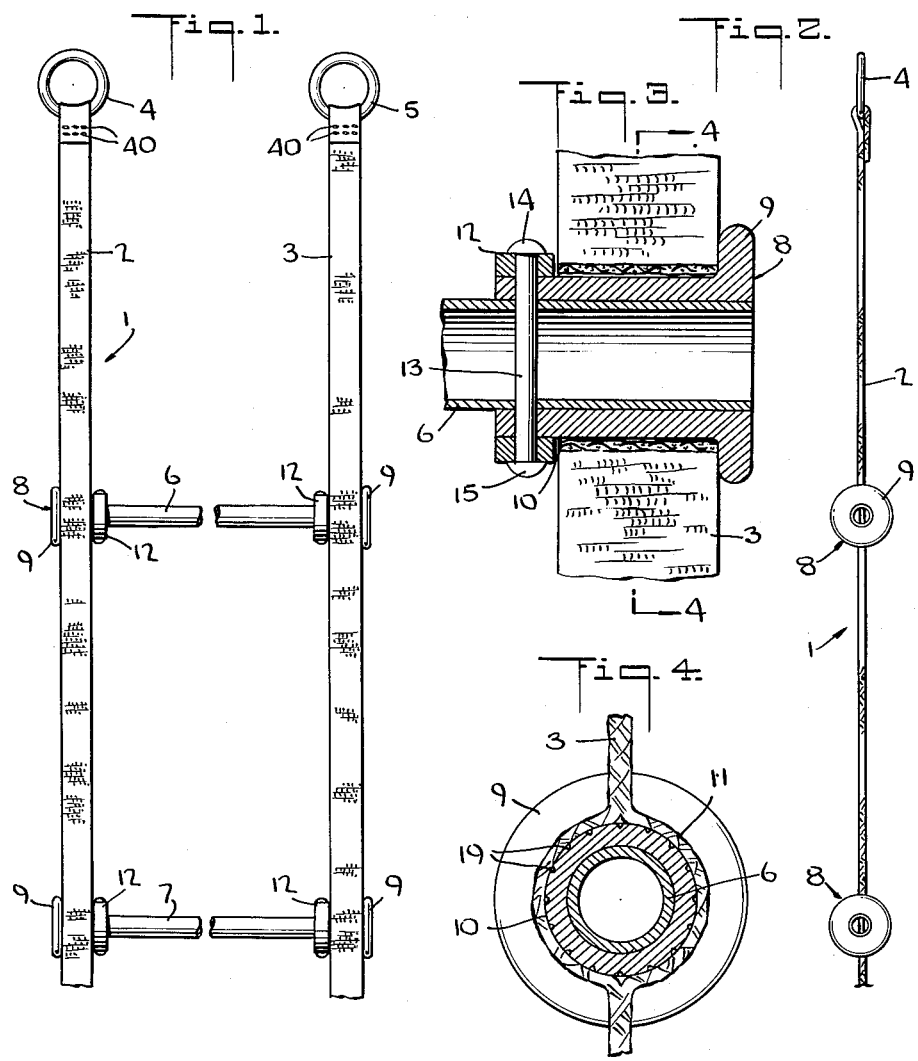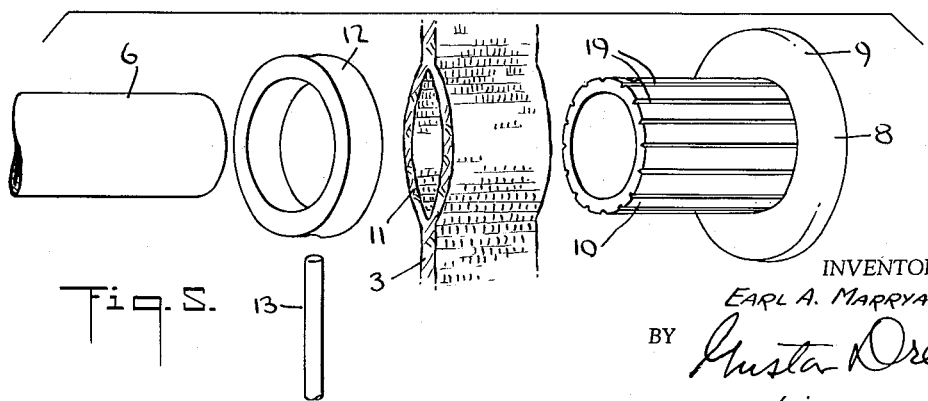

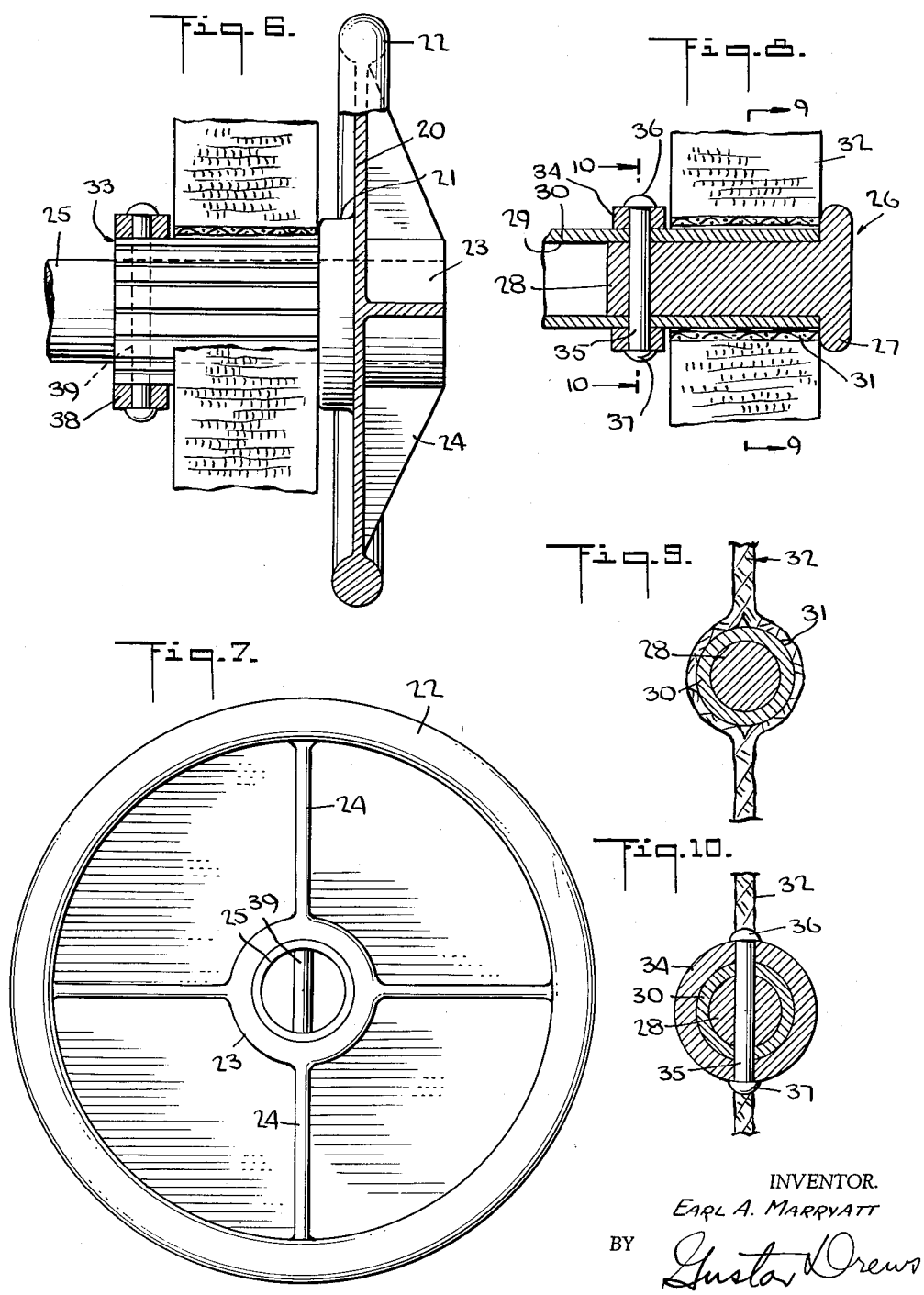

2,985,254
FLEXIBLE LADDER

Earl A. Marryatt, 190 Demarest Ave., Closter, N.J., assignor of fifty percent to Alexander C. Kidd, South Orange, N.J.

Filed July 3, 1958, Ser. No. 746,439

3 Claims. (Cl. 182—198)

This invention relates to flexible ladders in general such as Jacob's ladders and the like, particularly adapted for sea going vessels and the like.

Among the objects of the present invention it is aimed to provide an improved flexible ladder which can be folded into a compact package for storage in the interest of conserving space in vessels and the like, where space is at a premium, such as submarines, combat vessels, and even aircraft carriers.

It is still another object of the present invention to provide a flexible ladder having stiles which are non-corrosive to sea air and will withstand extreme weather conditions such as are encountered by sea going vessels in the Arctic as well as in the Tropics, which are in turn easy to handle without the risk of injury to the bare skin of users, such as the risk which is at present encountered with metal in extreme temperatures, which are substantially non-inflammable, and which furthermore have a breaking point of at least 4500 pounds.

More specifically, it is an object of the present invention to provide a flexible ladder having stiles composed of a webbing consisting of woven threads of nylon impregnated with latex such as is commercially sold by Narricott Mills as nylon webbing, which threads are ostensibly endless as compared to the short fibers of sisal and hemp, and therefore particularly adapted for webbing strips used as stiles.

These and other features, capabilities, and advantages of the invention will appear from the detailed description of specific embodiments thereof illustrated in the accompanying drawings in which:

Fig. 1 is a fragmental front elevation of a flexible ladder made according to one embodiment of the present invention.

Fig. 2 is a fragmental end elevation of the ladder shown in Fig. 1.

Fig. 3 is a fragmental longitudinal section of the connection between a stile and a rung of the embodiment illustrated in Figs. 1 and 2.

Fig. 4 is a transverse section on the line 4—4 of Fig. 3.

Fig. 5 is a fragmental exploded view of the connection shown in Fig. 3.

Fig. 6 is a fragmental view of a connection such as illustrated in Fig. 3 of a second embodiment partly in section.

Fig. 7 is an end view of the connection shown in Fig. 6.

Fig. 8 is a fragmental section of the connection of a third embodiment.

Fig. 9 is a section on the line 9—9 of Fig. 8.

Fig. 10 is a section on the line 10—10 of Fig. 8.

In the embodiment shown in Figs. 1 to 5 inclusive there is illustrated a flexible ladder 1 having two stiles 2 and 3 connected at their upper ends to the rings 4 and 5 respectively which are adapted to be connected to a structure such as the hull of a vessel. These stiles 2 and 3 in turn are connected to one another by a plurality of rungs such as the rungs 6 and 7. The rings 4, 5 and rungs 6, 7 may be composed of steel, aluminum or the like. The invention resides primarily in the provision of stiles 2 and 3 composed of a webbing of woven threads of nylon impregnated with latex. Excellent results have been achieved when these strips 2 and 3 are about 1¼" in width and ⁹⁄₃₂" in thickness for a Jacob's ladder in which the rungs are about 15" in width from stile 2 to stile 3, that is, an overall length for the rungs of about 19" and a diameter of about ⅞". The invention also consists in the formation of the connection between the stiles 2 and 3 and the rungs 6, 7. In this embodiment, the connection between each stile and a rung consists of a cylindrical unit 8 having a flange 9 with an internal diameter corresponding to the external diameter of the rung 6 to enable the rung 6 to receive the unit 8 as shown in Fig. 3. The outer cylindrical face 10 of the unit 8 is wide enough to receive the loop 11 formed in the stiles 2, 3 and the collar 12 mounted on the inner end of the face 10 as shown in Fig. 3. The loop 11 is then captured or confined between the flange 9 and the collar 12, the collar 12 being in turn secured to the unit 8 by the pin 13 which extends not only diametrically through the collar 12 and the inner end of the unit 8 but also through the rung 6. The pin 13 may have a head 14 at one end and be peened over or riveted at the other end to form the head 15.

The loop 11 in the stiles 2, 3 is prefabricated, that is prewoven and consists substantially of two ½ thicknesses 16 and 17 of the portion 18 of the stiles 2, 3. Preferably to anchor the loop 11 in position on the cylindrical face 10 of the unit 8 as shown in Fig. 5 said face is provided with longitudinally extending incisions or recesses 19.

The embodiment shown in Figs. 6 and 7 differs from the embodiment shown in Figs. 1 to 5 mainly by the disc 20 formed on the outside of the flange 21 such as the flange 9 of the embodiment illustrated in Figs. 1 to 5 inclusive. This disc 20 as illustrated may have an enlarged circular formation 22 and a hub 23 and ribs 24 extending from the hub 23 to the circular formation 22. In the embodiment shown in Figs. 6 and 7, the hub 23 is positioned at the outer end of the rung 25 whereas in the embodiment shown in Figs. 1 to 5 inclusive, the flange portion of the unit 8 is positioned at the outer end of the rung 6. In the embodiment shown in Figs. 8, 9, and 10, instead of the cylindrical unit 8 there is provided a cylindrical unit 26 which has a flange 27 on its outer end and a stud or extension 28 extending inwardly from the flange 6, the outer face of which is cylindrical and conforms to the inner cylindrical face 29 of the rung 30. Here the loop 31 of the stile 32 is conformed to the size of the rung 30 so as to fit on it snugly as shown in Figs. 8, 9 and 10, whereas in the embodiments shown in Figs. 1 to 5 inclusive and 6 and 7 inclusive, the loops in the stiles there shown conform snugly to fit the cylindrical units 8 and 33 of the embodiments illustrated in Figs. 3 and 6 respectively. Furthermore, in the embodiment illustrated in Figs. 8 to 10 inclusive, the collar 34 in place of the collar 12 of the embodiment illustrated in Fig. 3 has an internal diameter conformed to the external diameter of the rung 30 to fit on the same. The loop 31 in the present embodiment is confined or captured between the flange 27 and the collar 34, the collar 34 here having a pin 35 which extends through the collar 34, rung 30 and stud 28. The pin 35 here too may have a head 36 at one end and be peened over by a riveting unit to form the head 37.

The disc 20 of the embodiment illustrated in Figs. 6 and 7 may be composed of metal such as steel or aluminum or also of a plastic material. Excellent results have been achieved when the rungs 6, 7, 25 and 30 and the cylindrical units 8, 33 and 26, the collars 12, 38 and 34, the pins 13, 39 and 35 and the rings 4 and 5 are composed of aluminum.

Preferably, as shown in Figs. 1 and 2, the upper ends of the strips 2 and 3 are connected to the rings 4 and 5 by having the upper portion of each strip 2, 3 pass through a ring 4, 5 and lap over the main portion of the strip 2, 3 as shown in Fig. 2 and secured in place by stitches 40 or the like.

It is obvious that various changes and modifications may be made to the details of construction without departing from the general scope of the invention as set forth in the appended claims.

I claim:

1. In a flexible ladder, the combination of rigid tubular rungs, stiles composed of woven webbing strips impregnated with latex having integrally woven loops to receive the ends of said rungs, cylindrical connecting units telescoped on, and secured to, the ends of said rungs, said cylindrical connecting units having flanges at their ends adjacent the outer edges of said loops, collars mounted upon the inner ends of said connecting units adjacent the inner edges of said loops, and rivets securing said collars to the connecting unit and said rungs to anchor said strips on said rungs between said flanges and said collars, said connecting units having recesses formed in the periphery thereof extending axially of said rungs to cooperate with the latex impregnated strips to increase the friction between said connecting units and said strips to anchor said rungs against rotation relative to said stiles.

2. The combination as set forth in claim 1 in which discs extending transversely to the axis of said rungs are located on the outer ends of said flanges.

3. The combination as set forth in claim 1 in which said rungs, cylindrical extensions, collars and discs are composed of aluminum and said webbing strips are composed of nylon threads impregnated with latex.

References Cited in the file of this patent

UNITED STATES PATENTS

| | | |
|---|---|---|
| 271,498 | McElroy | Jan. 30, 1883 |
| 294,360 | Borgfeldt | Mar. 4, 1884 |
| 382,150 | Frey | May 1, 1888 |
| 644,265 | Thirion | Feb. 27, 1900 |
| 836,432 | Bryant | Nov. 20, 1906 |
| 2,511,077 | Race | June 13, 1950 |

FOREIGN PATENTS

| | | |
|---|---|---|
| 719,057 | Great Britain | Nov. 24, 1954 |
| 87,438 | Norway | May 14, 1956 |